(12) United States Patent
Mayer et al.

(10) Patent No.: US 12,247,372 B2
(45) Date of Patent: Mar. 11, 2025

(54) BOOM TURRET FOR AN EXCAVATION VEHICLE AND METHOD THEREOF

(71) Applicant: Federal Signal Corporation, Oak Brook, IL (US)

(72) Inventors: Timothy G. Mayer, Metamora, IL (US); Joseph L. Schmidt, Tonica, IL (US)

(73) Assignee: Federal Signal Corporation, Downers Grove, IL (US)

( * ) Notice: Subject to any disclaimer, the term of this patent is extended or adjusted under 35 U.S.C. 154(b) by 774 days.

(21) Appl. No.: 17/406,876

(22) Filed: Aug. 19, 2021

(65) Prior Publication Data
US 2022/0056665 A1  Feb. 24, 2022

Related U.S. Application Data

(60) Provisional application No. 63/069,262, filed on Aug. 24, 2020.

(51) Int. Cl.
*E02F 3/90* (2006.01)
*E02F 3/88* (2006.01)
(Continued)

(52) U.S. Cl.
CPC ............ *E02F 3/905* (2013.01); *E02F 3/8816* (2013.01); *F16L 27/0849* (2013.01); *E02F 3/9243* (2013.01)

(58) Field of Classification Search
CPC ....... E02F 3/905; E02F 3/9243; E02F 3/8816; E02F 3/8891; E02F 3/925; E02F 3/88;
(Continued)

(56) References Cited

U.S. PATENT DOCUMENTS

| 4,199,837 A | * | 4/1980 | Fisco, Jr. | ................ E03F 7/103 15/352 |
| 4,878,517 A | * | 11/1989 | Prange | .................... B05B 12/06 134/167 C |

(Continued)

FOREIGN PATENT DOCUMENTS

| CN | 105971108 A | 9/2016 |
| WO | 2013044803 A1 | 4/2013 |

OTHER PUBLICATIONS

Declaration of Timothy G. Mayer with Attachments A-G.

*Primary Examiner* — Thomas B Will
*Assistant Examiner* — Robert E Pezzuto
(74) *Attorney, Agent, or Firm* — Merchant & Gould P.C.

(57) ABSTRACT

A boom turret for a debris body. The boom turret includes an inlet defining an inlet axis and configured to couple to a hose. An outlet defining an outlet axis and configured to rotatably couple to the debris body. The inlet axis is substantially orthogonal to the outlet axis and a debris flow path is defined within the boom turret between the inlet and the outlet. A plate is disposed between the inlet and the outlet and has a surface at least partially defining the debris flow path through the boom turret. A nozzle is coupled to the plate and extends into the debris flow path. A pressure vessel is configured to hold a charge of pressurized fluid, and the pressure vessel is coupled in flow communication with the nozzle and selectively releases the charge of pressurized fluid through the nozzle to dislodge accumulated debris within the debris flow path.

18 Claims, 13 Drawing Sheets

(51) Int. Cl.
  *E03F 7/10* (2006.01)
  *F16L 27/08* (2006.01)
  *E02F 3/92* (2006.01)

(58) Field of Classification Search
  CPC . E02F 5/226; E02F 5/223; E02F 5/003; E03F 7/106; E03F 7/10; E03F 9/007; F16L 27/0849; E04F 17/126; B08B 9/0321; B08B 9/0326; B08B 9/053; B08B 9/0433; B08B 9/027; B08B 9/032; B08B 3/02; B08B 5/00; B08B 5/02
  See application file for complete search history.

(56) References Cited

U.S. PATENT DOCUMENTS

| | | | |
|---|---|---|---|
| 4,922,571 A * | 5/1990 | Driear | E03F 7/106 |
| | | | 15/340.1 |
| 6,913,689 B2 | 7/2005 | Portman | |
| 7,228,736 B2 | 6/2007 | Smith | |
| 8,333,818 B2 | 12/2012 | Foerster et al. | |
| 8,739,354 B2 | 6/2014 | Buckner | |
| 8,914,938 B1 | 12/2014 | Lee | |
| 9,718,018 B2 | 8/2017 | Haynam et al. | |
| 10,323,397 B2 * | 6/2019 | Mimms | E03C 1/306 |
| 10,538,949 B2 | 1/2020 | Sewell | |
| 2002/0185458 A1 | 12/2002 | Portman | |
| 2007/0039384 A1 | 2/2007 | Smith | |
| 2010/0326481 A1 | 12/2010 | Buckner | |
| 2011/0296999 A1 | 12/2011 | Foerster et al. | |
| 2014/0251384 A1 | 9/2014 | Haynam et al. | |
| 2014/0345650 A1 | 11/2014 | Schmidt | |
| 2016/0258148 A1 * | 9/2016 | Pant | B08B 9/0321 |
| 2019/0178017 A1 | 6/2019 | Sewell | |
| 2020/0149246 A1 | 5/2020 | Strobel et al. | |
| 2020/0164389 A1 | 5/2020 | Strobel et al. | |
| 2020/0309304 A1 * | 10/2020 | Gevik | E02F 3/8816 |

* cited by examiner

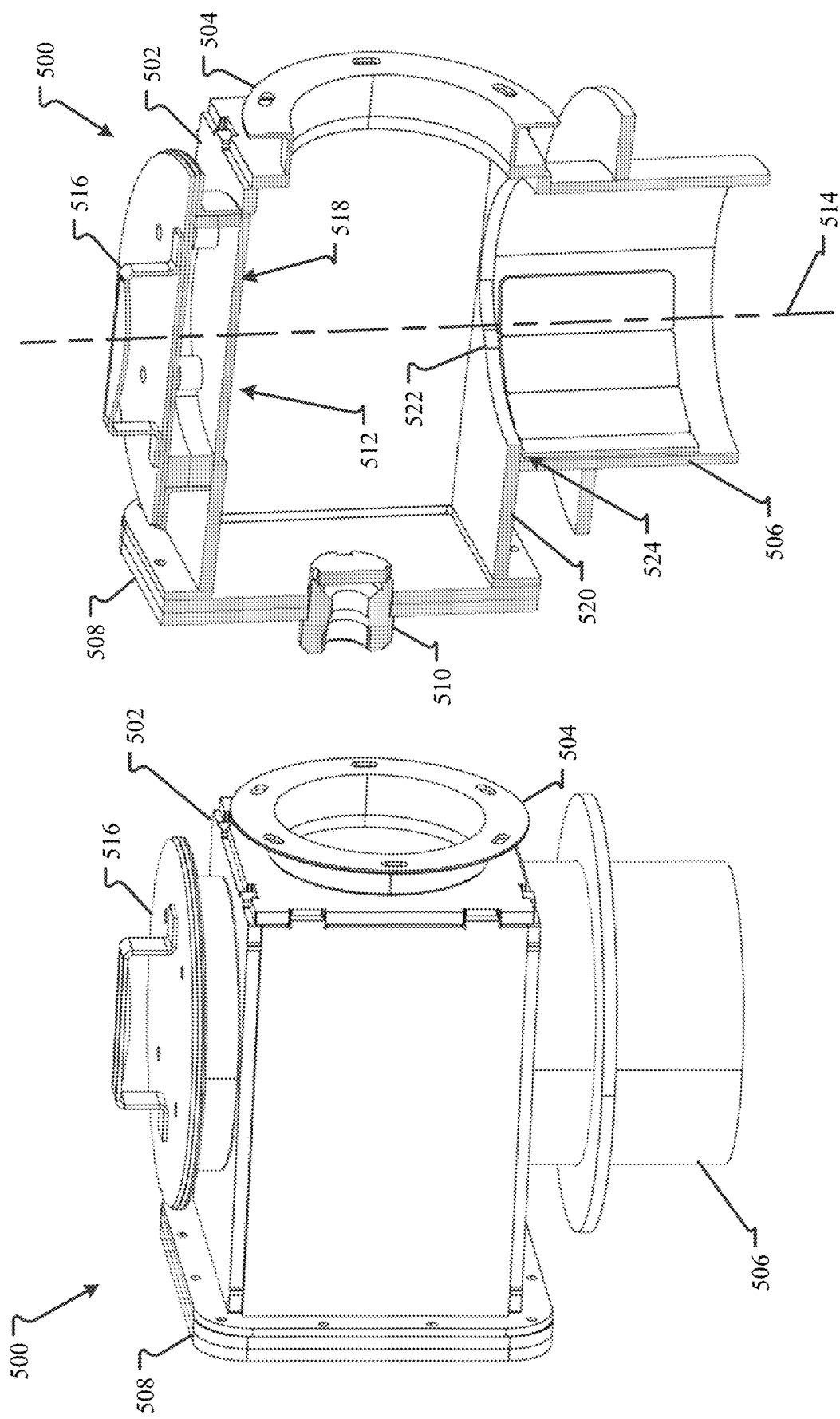

BOOM TURRET FOR AN EXCAVATION VEHICLE AND METHOD THEREOF

CROSS-REFERENCE TO RELATED APPLICATION

This application claims the benefit of U.S. Provisional Patent Application Ser. No. 63/069,262, filed Aug. 24, 2020, which is incorporated herein by reference in its entirety.

BACKGROUND

Excavation vehicles are generally used for excavation processes. Excavation is the process of using a fluid (e.g., air, water, or the like) to disturb material (e.g., soil) to be excavated, which is then vacuumed up through a hose into a debris body. The material, also known as debris, typically travels through the hose and enters the debris body at or near the top of the body. In some examples, a turret is disposed between the hose and the debris body and enables the hose to rotate relative to the debris body. However, the flow path for the vacuumed debris through the turret is often required to make a sharp turn (e.g., about 90°) to enter the debris body. As a result, debris quickly accumulates in the turret and ultimately plugs the flow path, thereby requiring unplugging of the turret so as to continue the vacuum operation. Unplugging the turret is often difficult and time consuming. In some known turrets, the operator must get on top of the debris body to manually remove the accumulated debris, or plug through a clean out port, or beat on the hose so as to dislodge the debris before continuing the vacuum operation.

SUMMARY

In general terms, the present disclosure relates to boom turrets for excavation vehicles. The boom turret uses pressurized fluid to remove the accumulation of debris from within the boom turret and entrains it into the vacuum air stream that leads to the debris body. The pressurized fluid is activated at predetermined intervals to prevent the material from building-up enough in the boom turret to block the flow path completely. Additionally, the structure of the boom turret at least partially utilizes the debris accumulation itself to aid in removing debris buildup on other surfaces within the boom turret. Upon release of the pressurized fluid, the momentum of the dislodged materials also aids in dislodging other accumulation areas. Furthermore, letting the debris at least partially buildup on itself reduces wear on the boom turret during the vacuum operation.

In one aspect, the technology relates to a boom turret for a debris body, the boom turret including: an inlet defining an inlet axis and configured to couple to a hose; an outlet defining an outlet axis and configured to rotatably couple to the debris body, wherein the inlet axis is substantially orthogonal to the outlet axis and a debris flow path is defined within the boom turret between the inlet and the outlet; a plate disposed between the inlet and the outlet and having a surface at least partially defining the debris flow path through the boom turret; a nozzle coupled to the plate and extending into the debris flow path; and a pressure vessel configured to hold a charge of pressurized fluid, wherein the pressure vessel is coupled in flow communication with the nozzle and selectively releases the charge of pressurized fluid through the nozzle to dislodge accumulated debris within the debris flow path.

In an example, the nozzle includes at least one opening, and the at least one opening is oriented in a direction that is substantially orthogonal to the inlet axis. In another example, the nozzle is aligned with the inlet axis. In still another example, an accumulation chamber is configured to allow accumulation of debris within the debris flow path, and the nozzle is at least partially disposed within the accumulation chamber. In yet another example, the accumulation chamber is disposed between the inlet and the plate. In an example, a replaceable wear panel at least partially covers the surface of the plate. In another example, an access hatch is configured to allow access into the debris flow path, and the access hatch is axially aligned with the outlet.

In another aspect, the technology relates to an excavation vehicle including: at least one pressurized fluid line configured to channel a flow of pressurized fluid; a debris body; a hose; and a boom turret coupling the debris body and the hose in flow communication, wherein the boom turret includes: an outlet rotatably mounted on top of the debris body and extending substantially vertically relative to the debris body; an inlet coupled to the hose and extending substantially horizontally relative to the debris body, wherein a debris flow path is defined between the outlet and the inlet and allows vacuumed debris to flow from the hose and into the debris body; a plate at least partially defining the debris flow path; and a nozzle coupled to the plate and disposed at least partially within the debris flow path, wherein the nozzle selectively receives the flow of pressurized fluid from the at least one pressurized fluid line to dislodge accumulated debris within the debris flow path.

In an example, the nozzle includes at least one opening, and the at least one opening is oriented in a direction that is substantially parallel to the plate. In another example, the at least one opening includes four openings, and each of the four openings are spaced approximately 90° from each other. In still another example, the nozzle is centered on the plate. In yet another example, the plate is disposed opposite of the inlet and with the outlet therebetween. In an example, the plate is offset from the outlet such that an accumulation chamber is defined adjacent the plate and configured to allow accumulation of debris within the debris flow path. In another example, the boom turret further includes an access hatch with a cover, and the cover has an inner surface that is substantially flush with the boom turret when in a closed position. In still another example, the at least one pressurized fluid line includes a pressure vessel coupled to a chassis compressor of the excavation vehicle.

In another aspect, the technology relates to a method of dislodging accumulated debris within a boom turret of an excavation vehicle, the method including: vacuuming debris through a hose and into a debris body of the excavation vehicle, wherein the boom turret is disposed between the hose and the debris body and enables the hose to rotate relative to the debris body; accumulating debris within an accumulation chamber of the boom turret; selectively releasing a charge of pressurized fluid into the accumulation chamber via a nozzle mounted to a plate within the boom turret so as to dislodge at least a portion of the accumulated debris, wherein releasing the charge of pressurized fluid occurs in conjunction with vacuuming debris; and receiving the dislodged accumulated debris within the debris body.

In an example, selectively releasing a charge of pressurized fluid occurs at predetermined time intervals during the vacuuming operation. In another example, the method further includes generating another charge of pressurized fluid after a charge is released. In still another example, the pressurized fluid is compressed air from a chassis compressor of the excavation vehicle. In yet another example, the method further includes replacing one or more wear panels within the boom turret.

BRIEF DESCRIPTION OF THE DRAWINGS

FIG. 15 is a perspective view of another boom turret for the excavation vehicle shown in FIG. 1.

FIG. 16 is a cross-sectional view of the boom turret shown in FIG. 15.

DETAILED DESCRIPTION

Figure 1:
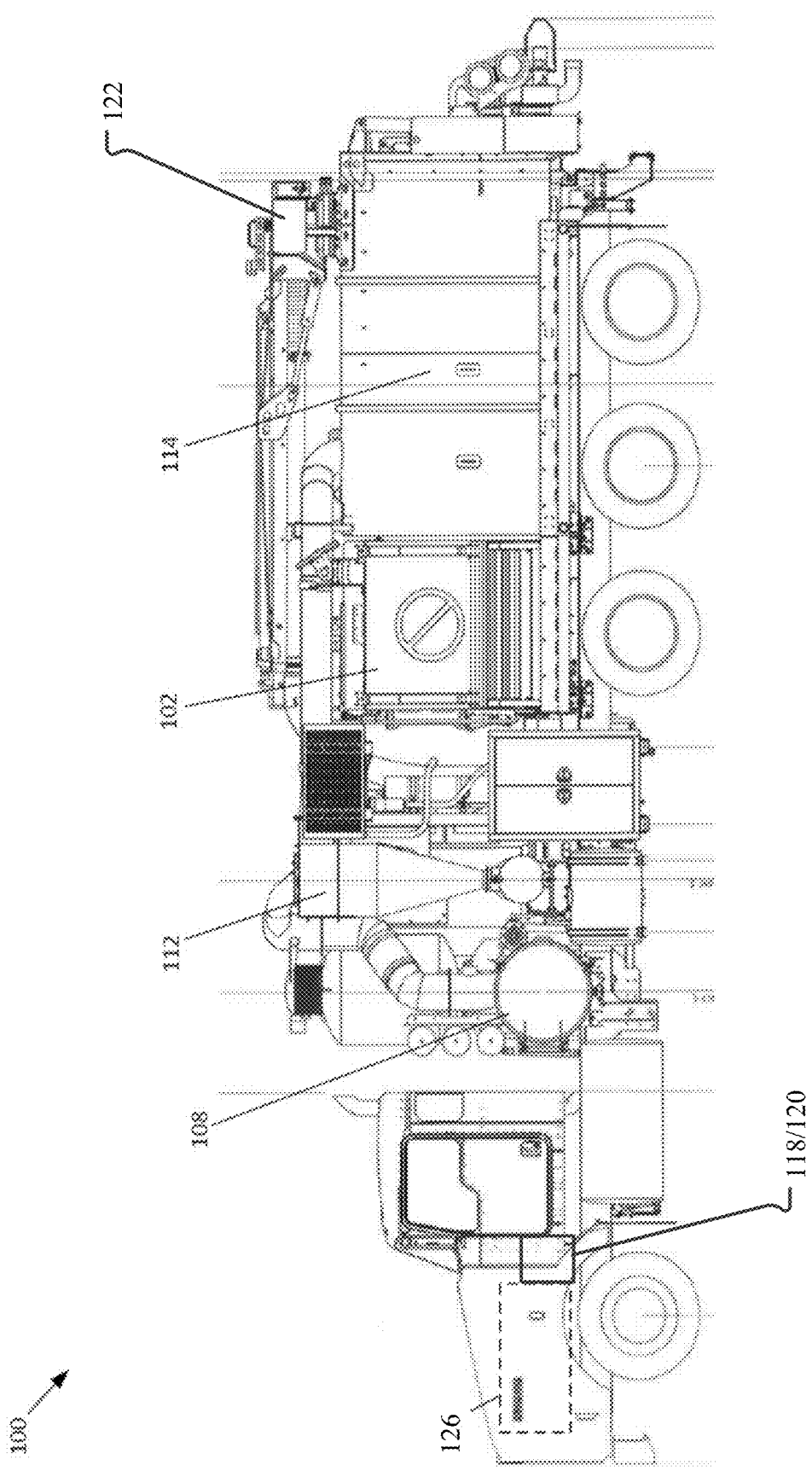
FIG. 1 is a side elevation view of an exemplary excavation vehicle.

Various embodiments will be described in detail with reference to the drawings, wherein like reference numerals represent like parts and assemblies throughout the several views.

This disclosure describes a boom turret for excavation vehicles that has an unclogging system. The unclogging system reduces or prevents debris accumulation in the boom turret so that a debris flow path into a debris body remains substantially unobstructed for vacuumed debris. The boom turret includes an inlet and an outlet that defines the debris flow path. In an aspect, the debris flow path can include a relative sharp turn (e.g., about 90°) within the boom turret. An accumulation chamber is defined within the boom turret and is sized and shaped to at least partially allow for some accumulation of debris within the flow path. A plate having a nozzle is disposed within the accumulation chamber. The nozzle is coupled to a pressurized fluid circuit so that a charge of pressurized fluid can selectively be discharged into the accumulation chamber. The release of pressurized fluid from the nozzle into the accumulation chamber generates a force that dislodges and breakups the accumulated debris so as to prevent the debris from building-up enough to block the flow path completely. Additionally, the momentum from the dislodged debris aids in reducing debris accumulation on other walls of the boom turret. In the examples, the pressurized fluid is directed by the nozzle in a direction that is substantially parallel to the surface of the plate so that the accumulated debris can be more efficiently dislodged.

Figure 2:
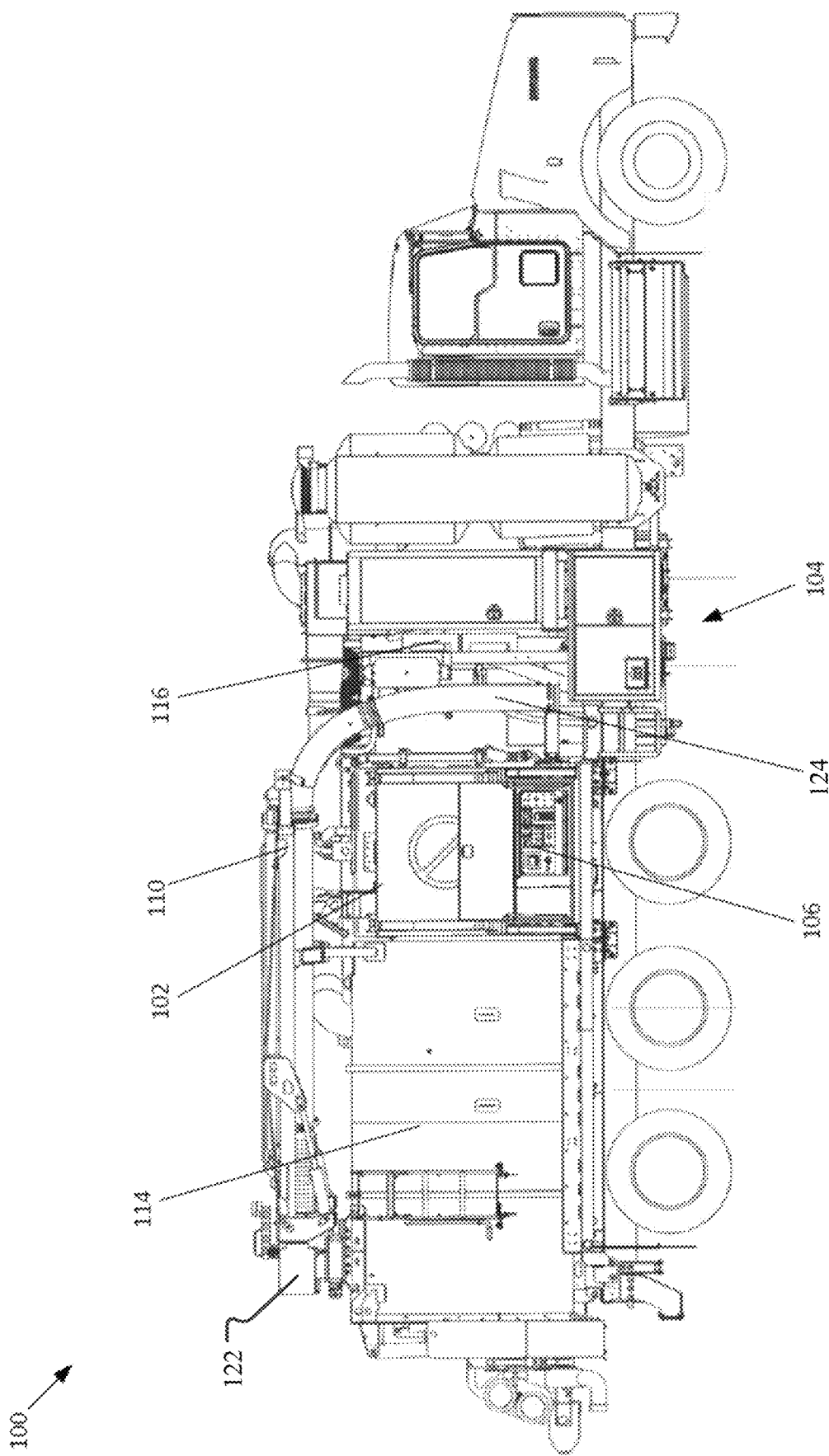
FIG. 2 is another side elevation view of the excavation vehicle shown in FIG. 1.
Figure 3:
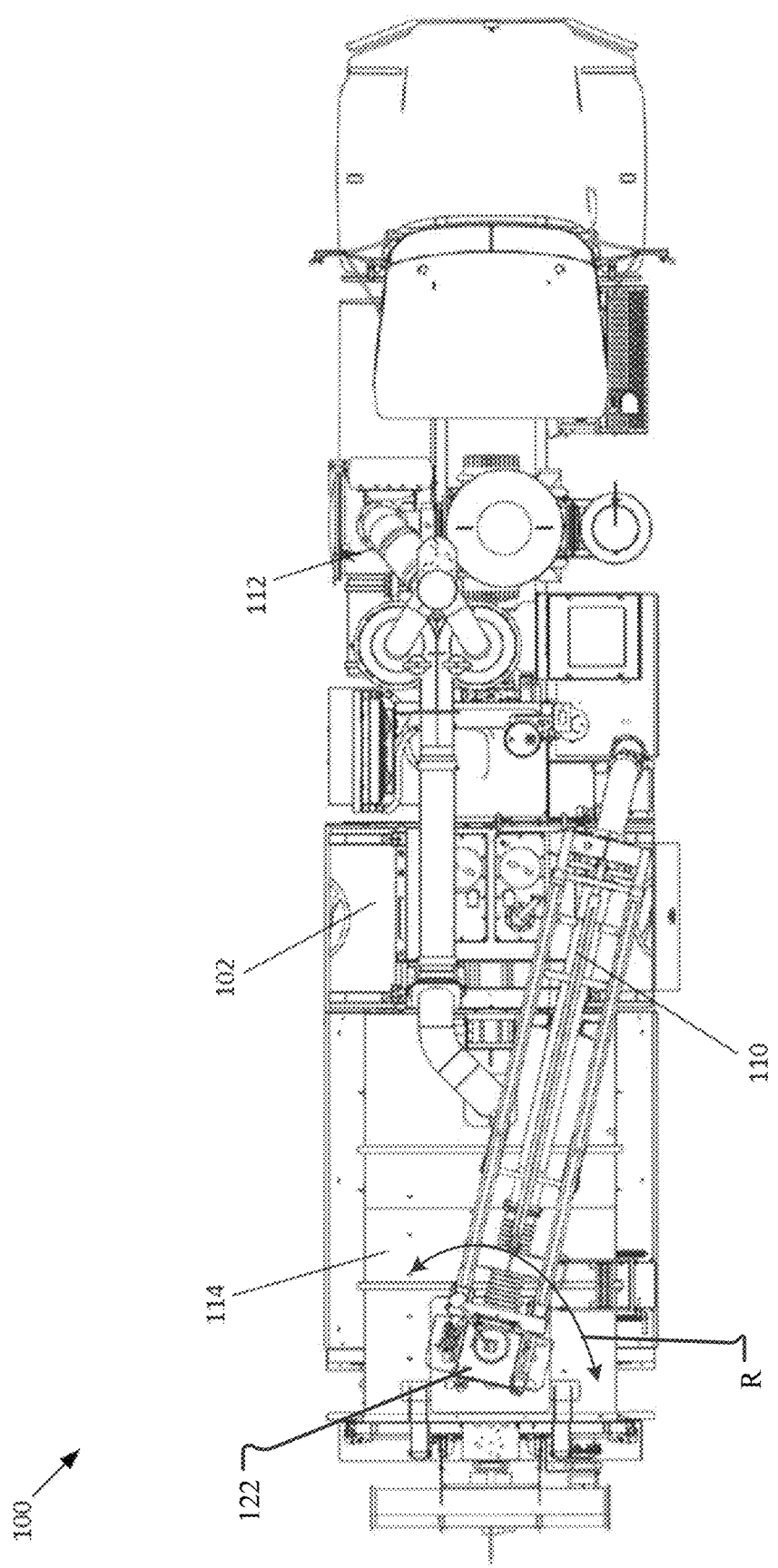
FIG. 3 is a top view of the excavation vehicle shown in FIG. 1.

FIG. 1 is a side elevation view of an exemplary excavation vehicle 100. FIG. 2 is another side elevation view of the excavation vehicle 100. FIG. 3 is a top view of the excavation vehicle 100. Referring concurrently to FIGS. 1-3, the vehicle 100 can include a water tank 102, a water pump control system 104, a control panel 106, an air mover system 108, a boom and vacuum hose 110, a cyclone separator 112, a debris body 114, a water heating system 116, an air compressor 118, and an air compressor control system 120. In the example, the vehicle 100 is described as a combination hydro/air excavation unit meaning that it can use either water to cut the excavated material or air. In other aspects, the vehicle 100 may be a hydro-only excavation unit that uses only water or an air-only excavation unit that uses only air as required or desired.

The vehicle 100 includes a water pump system to generate pressurized water for injecting into the material (e.g., soil) and breaking it up while removing debris by air suction and the hose 110. The water tank 102 operates to contain the water used for hydro excavation, while the water pump control system 104 can be used to control flow rate, pressure, etc. The vehicle 100 also includes an air compression system to generate compressed air for injecting into the soil and breaking it up while removing debris by air suction and the hose 110. The air compressor 118 operates to generate pressurized air, while the air compressor control system 120 can be used to control flow rate, pressure, etc.

The control panel 106 is configured to enable an operator to interact with several operative elements of the vehicle 100, such as the water pump control system 104 and/or the air compressor control system 120. In the example, the control panel 106 is contained in a control box that is located curbside of the vehicle 100 for easy access and efficient operation. The control panel 106 can provide various controls, such as a tachometer and hour meter for various components (e.g., a water pump and an air mover), temperature indicators for various systems, a water pump circuit on/off switch, boom and body dump functions, an emergency stop button, compressed air circuit solenoid release valves, and various other controls. The control panel 106 can communicate with a remote controller that is operated by the operator with either wireless or wired connection. In some embodiments, the control panel 106 includes a display screen to display various pieces of information, such as water or air pressure.

The air mover system 108 operates to actuate an air mover to create a vacuum through the hose 110 to draw debris into the debris body 114. The hose 110 is rotatably mounted on the top of the debris body 114 and rotatable R at least partially around the vehicle 100. The hose 110 is also extendable in length to cover a large working area. In the example, the hose 110 is mounted to the debris body 114 via a boom turret 122. The boom turret 122 is described further below and in reference to FIGS. 4-6. The boom turret 122 can rotate R relative to the debris body 114 so as to enable hose 110 movement. In an example, the rotation R can be a full 360° or be limited to a smaller rotational angle (e.g., about 320°). The hose 110 can include a digging tube 124 at a forward end thereof. In an aspect, the hose 110 can be about 6 inches in diameter, although other sizes are also contemplated herein.

The cyclone separator 112 operates with the air mover system 108 to filter air, thereby increasing air-routing performance. The debris body 114 is configured to collect debris through the hose after the soil is cut and broken down by the pressurized fluid (e.g., air or water). As used herein, debris, can include dirt, soil, sand, gravel, clay, aggregate, rocks, bricks, or any other type of material that is required or desired to be excavated and can be either wet or dry. The water heating system 116 operates to preheat water in the water tank 102 in cold weather conditions. The vehicle 100 also includes an engine 126 for driving and/or operating the systems and components described herein. In other examples, an auxiliary power plant or engine may be provided as required or desired. Additionally, the vehicle 100 can include one or more hydraulic systems to enable movement of one or more of the components (e.g., the boom and vacuum hose 110) as described herein.

Figure 4:
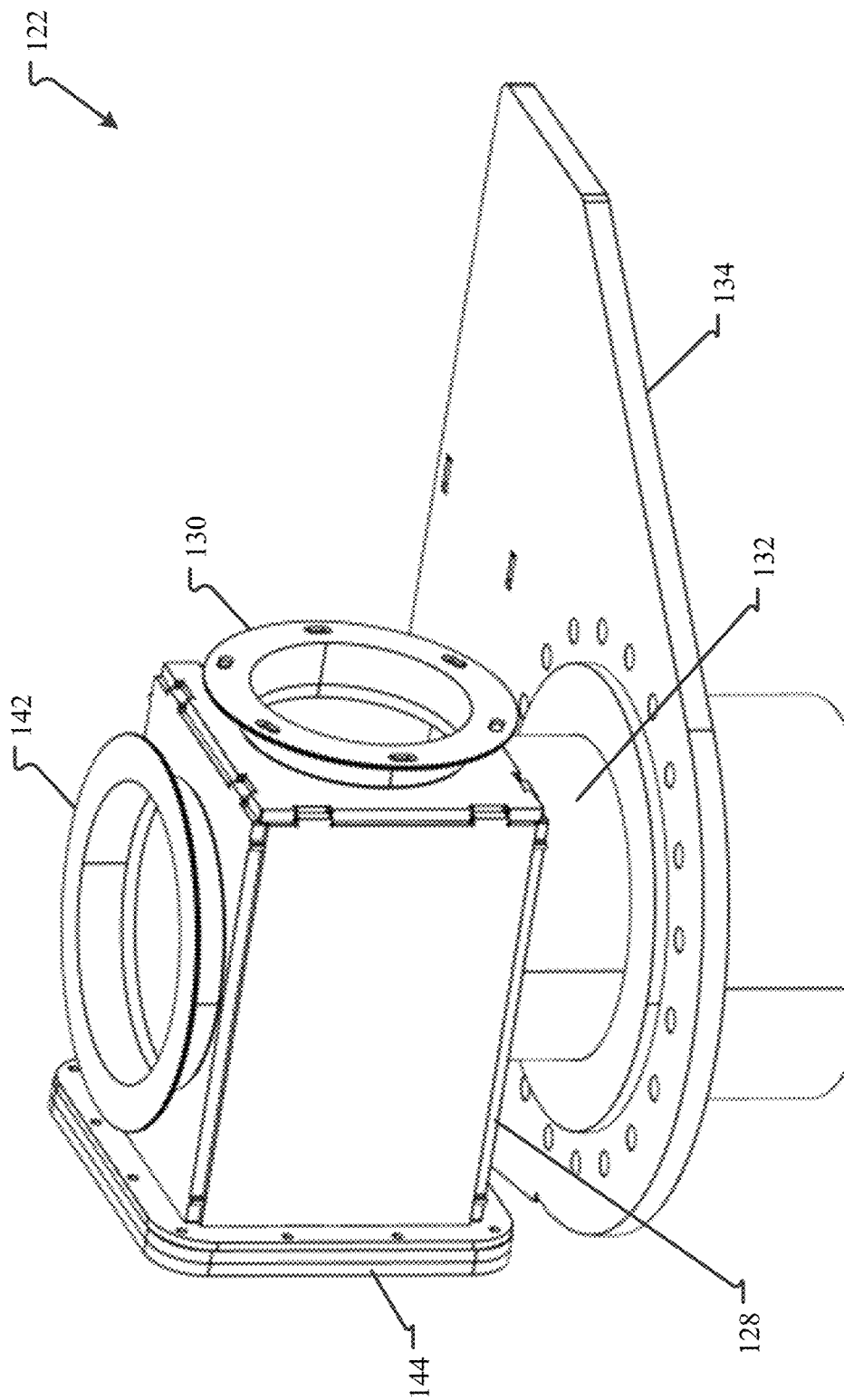
FIG. 4 is a perspective view of an exemplary boom turret for the excavation vehicle shown in FIG. 1.
Figure 5:
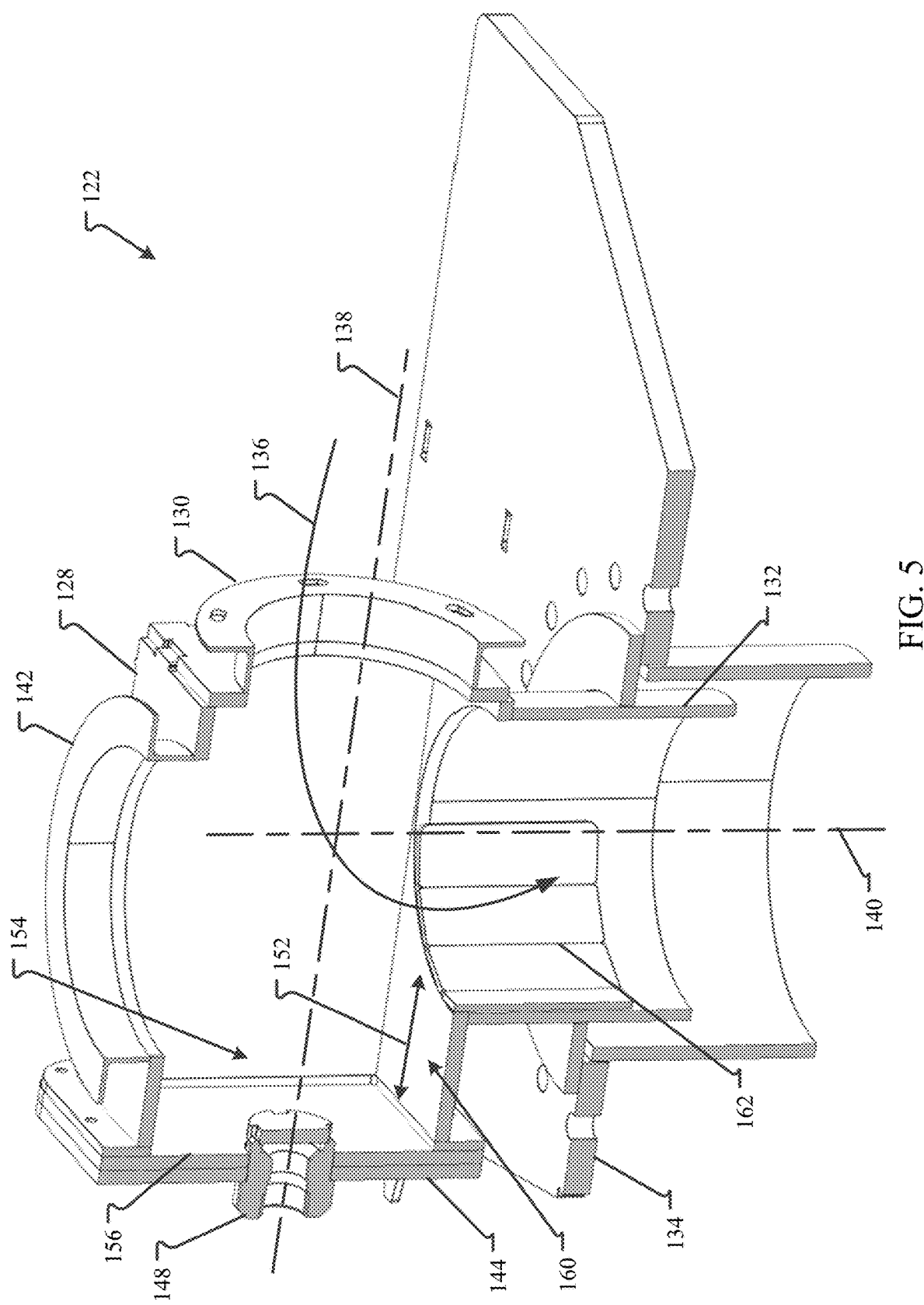
FIG. 5 is a cross-sectional view of the boom turret shown in FIG. 4.
Figure 6:
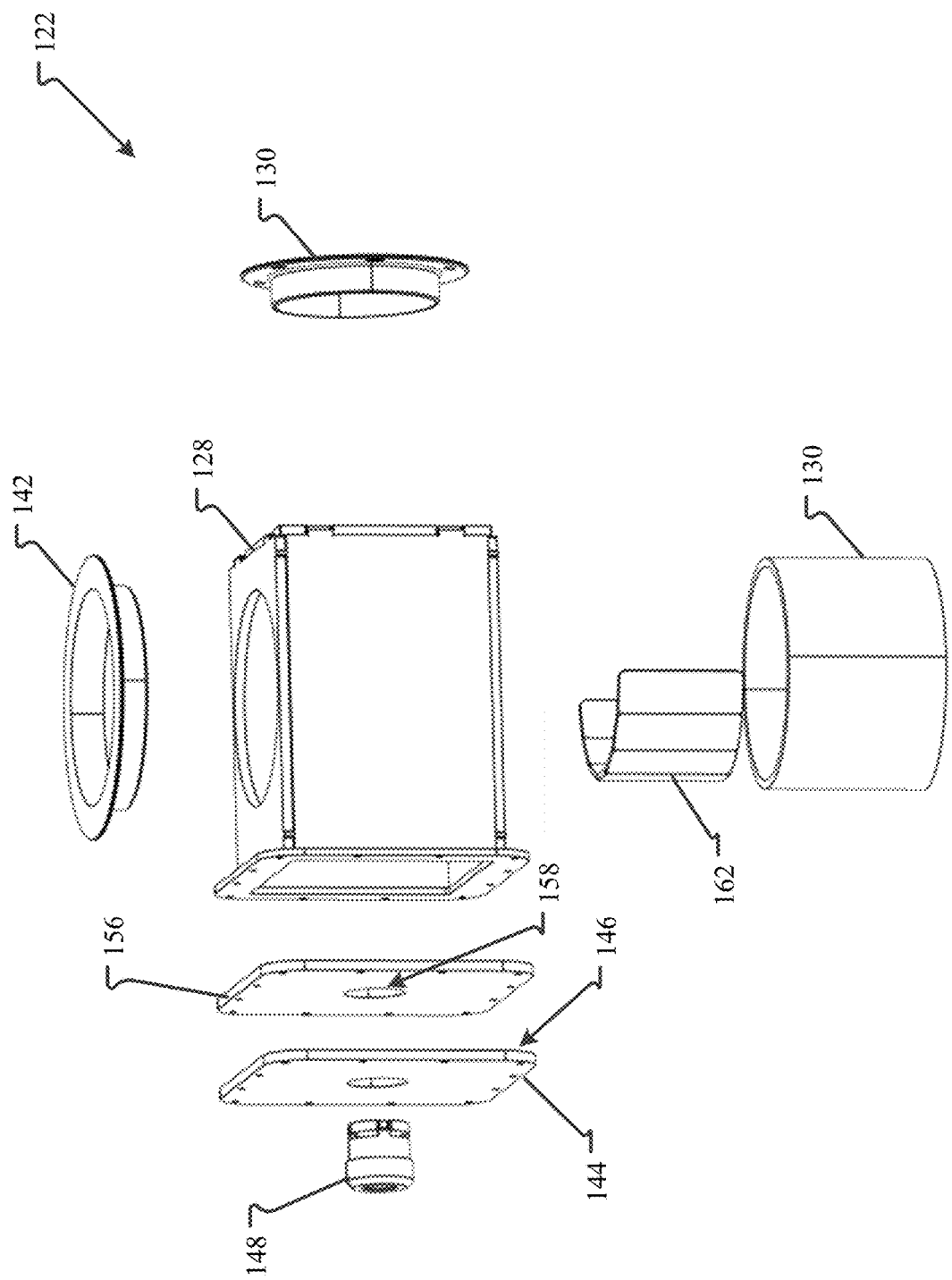
FIG. 6 is an exploded perspective view of the boom turret shown in FIG. 4.

FIG. 4 is a perspective view of the boom turret 122 for the excavation vehicle 100 (shown in FIG. 1). FIG. 5 is a cross-sectional view of the boom turret 122. FIG. 6 is an exploded perspective view of the boom turret shown 122. Referring concurrently to FIGS. 4-6, the boom turret 122 is configured to couple the hose 110 and the debris body 114 (both shown in FIGS. 1-3) in flow communication so that debris can be channeled into the debris body. The boom turret 122 includes a body 128 having an inlet 130 configured to couple to the hose and an outlet 132 configured to couple to the top of the debris body. In the example, the hose is coupled to the inlet 130 and the hose is enabled such that it can be rotated so as to reduce wear. The outlet 132 is rotatably coupled to the debris body so that the hose attached to the inlet 130 can rotate relative to the vehicle and debris body. For example, the outlet 132 can be supported on a bearing plate 134 that is configured to rotate relative to the debris body (e.g., via a hydraulic system).

A debris flow path 136 is defined within the boom turret 122 between the inlet 130 and the outlet 132 and allows vacuumed debris to flow from the hose and into the debris body. The inlet 130 defines an inlet axis 138 and the outlet defines an outlet axis 140. In the example, the inlet axis 138 is substantially orthogonal to the outlet axis 140 and as such the debris flow path 136 has to make a relatively sharp turn (e.g., about 90°) within the boom turret 122. The inlet 130 and the inlet axis 138 extend substantially horizontally relative to the debris body and the vehicle upon a ground surface. The outlet 132 and the outlet axis 140 extend substantially vertically relative to the debris body and the vehicle upon a ground surface.

The body 128 contains a plurality of walls that at least partially define the debris flow path 136. For example, a bottom wall includes the outlet 132 and a front wall includes the inlet 130. A top wall includes an access hatch 142 configured to allow access into the body 128 and the debris flow path 136. In an aspect, the access hatch 142 is positioned at least partially above the outlet 132 along the outlet axis 140. A rear wall includes a plate 144 that is disposed between the inlet 130 and the outlet 132 with respect to the debris flow path 136 and has a surface 146 that at least partially defines the debris flow path 136 through the boom turret 122. In an aspect, the plate 144 is disposed opposite of the inlet 130 on the body 128 and along the inlet axis 138 with the outlet 132 disposed therebetween. In another aspect, the plate 144 is substantially orthogonal to the inlet axis 138.

A nozzle 148 is coupled to the plate 144 and extends at least partially into the debris flow path 136 within the body 128. The nozzle 148 is configured to couple to a pressurized fluid circuit 200 (shown in FIG. 11) so as to selectively receive a flow of pressurized fluid to dislodge accumulated debris within the debris flow path 136 and the body 128. In an aspect, the nozzle 148 is axially aligned with the inlet axis 138. The plate 144 and nozzle 148 are described further below and in reference to FIGS. 7-10.

In the example, the plate 144 is offset 152 from the outlet 132 and in a direction along the inlet axis 138 that is away from the inlet 130. This offset 152 at least partially defines an accumulation chamber 154 within the body 128 adjacent the plate 144 and downstream of the inlet 130 while being upstream of the outlet 132. The accumulation chamber 154 is configured to allow for the accumulation of debris within the flow path 136. In an aspect, the accumulation chamber 154 is disposed between the inlet 130 and the plate 144. In another aspect, the nozzle 148 is at least partially disposed within the accumulation chamber 154.

In operation, the excavation vehicle generates a vacuum and debris is channeled through the debris flow path 136. As the debris flows through the debris flow path 136 at least a portion of the debris accumulates within the boom turret 122, for example, within the accumulation chamber 154. A charge of pressurized fluid is released into the debris flow path 136 via the nozzle 148 so as to dislodge at least a portion of the accumulated debris. The dislodged debris then continues towards the debris body as the pressurized fluid is released while the vacuum is still being generated. In an aspect, the release of pressurized fluid can occur at predetermined time intervals so as to prevent debris from building-up and blocking the flow path completely. For example, the time intervals may be about 30-45 seconds. In other examples, the time intervals may be based at least partially on the vacuum flow rate or pressure of the excavation vehicle. In other aspects, the release of pressurized fluid can occur once a predetermined condition within the boom turret 122 is satisfied. For example, a debris accumulation sensor may be used. In other examples, vacuum flow rate or pressure sensors can be used, and once the flow rate or pressure drops below a predetermined value, the pressurized fluid can be released.

In the example, by allowing partial accumulation of the debris within the debris flow path 136, the force of the accumulated debris being dislodged by the pressurized fluid aids and increases the removal of accumulated debris from other surfaces within the boom turret 122 and adjacent to the plate 144 (e.g., sidewalls of the body 128 and/or the outlet 132). Furthermore, partial accumulation of debris within the boom turret 122 also reduces wear on the components of the turret 122. This is because the accumulation can absorb at least a portion of the forces that are generated while debris (e.g., large aggregate, rocks, etc.) is being channeled through the debris flow path 136 and making the turn into the outlet 132. In some aspects, a full blockage of the debris flow path 136 is not allowed to occur during the vacuum operation of the excavation vehicle.

In the example, the accumulated debris from within the accumulation chamber 154 is dislodged in a direction that is along the inlet axis 138 and towards the inlet 130. As such, the accumulated debris is moved in a direction that is substantially opposite of the debris flow path 136. However, the accumulated debris is typically dislodged during the vacuum operation of the vehicle, and as such, the dislodged debris is vacuumed through the outlet 132 and into the debris body.

To further protect the boom turret 122 from wear and to increase its lifecycle, one or more replaceable wear panels may be coupled to one or more surfaces that define the debris flow path 136. The wear panels can be formed from a plastic based low friction material, a high tensile strength metal, or other suitable high wear materials so as to protect high wear interior surfaces of the boom turret 122 while not impeding the debris flow path 136 and able to be replaceable. In an aspect, a replaceable wear panel 156 can be coupled to the plate 144 and at least partially cover the surface 146. This wear panel 156 has an aperture 158 so that the nozzle 148 can extend therethrough and is disposed downstream of the inlet 130 and in a high contact debris zone. In an example, the wear panel 156 may have a corresponding shape and size with the plate 144.

In another aspect, one or more replaceable wear panels 162 can be coupled to the outlet 132 and disposed on a downstream surface. For example, the wear panels 162 can circumferentially extend about 180° around the downstream surface of the outlet 132. The wear panels 156, 162 may all have the same thickness, or have different thicknesses based at least partially on the wear induced within the debris flow path 136. In yet another aspect, one or more of the walls that define the body 128 may be formed from a high strength material so as to reduce wear on the boom turret 122 during operation. For example, a rear portion 160 of the bottom wall and behind the outlet 132 can be formed from a high strength material.

As illustrated in FIGS. 4-6, the plate 144 and nozzle 148 are disposed on a rear sidewall of the body 128. It should be appreciated that in other aspects, the plate and nozzle may be disposed on a left and/or right sidewall of the body 128 and dislodge accumulated debris in a direction is substantially orthogonal to both the inlet axis 138 and the outlet axis 140. In still other aspects, the plate and nozzle may be disposed on a top wall of the body 128 and then have the access hatch 142 be disposed on the rear sidewall.

Figure 7:
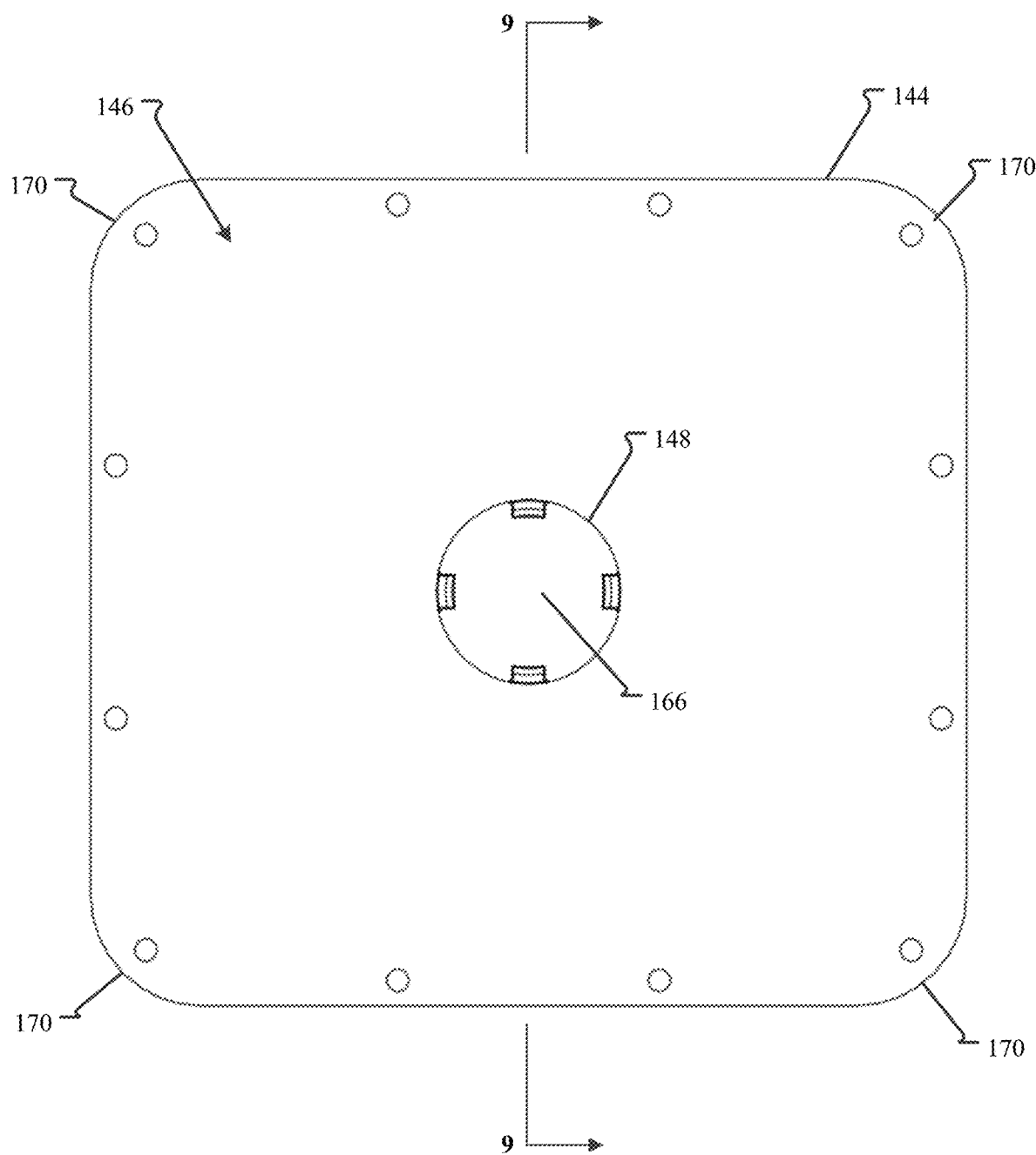
FIG. 7 is an elevation view of an exemplary plate and nozzle for the boom turret shown in FIGS. 4-6.
Figure 9:
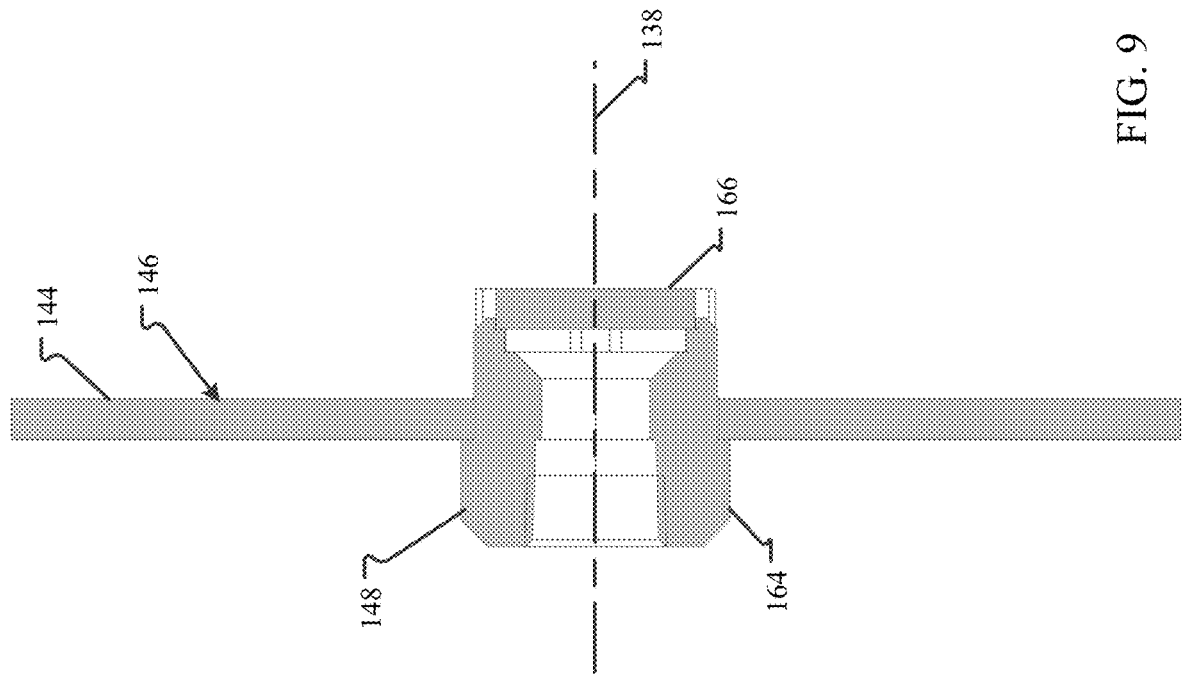
FIG. 9 is a cross-sectional view of the plate and nozzle shown in FIG. 7 and taken along line 9-9.
Figure 8:
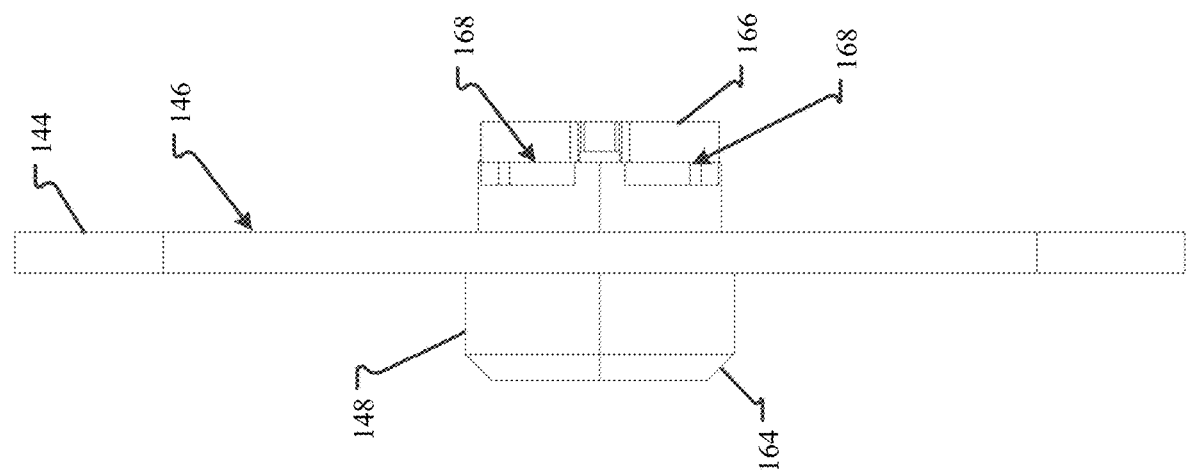
FIG. 8 is a side view of the plate and nozzle shown in FIG. 7.
Figure 10:
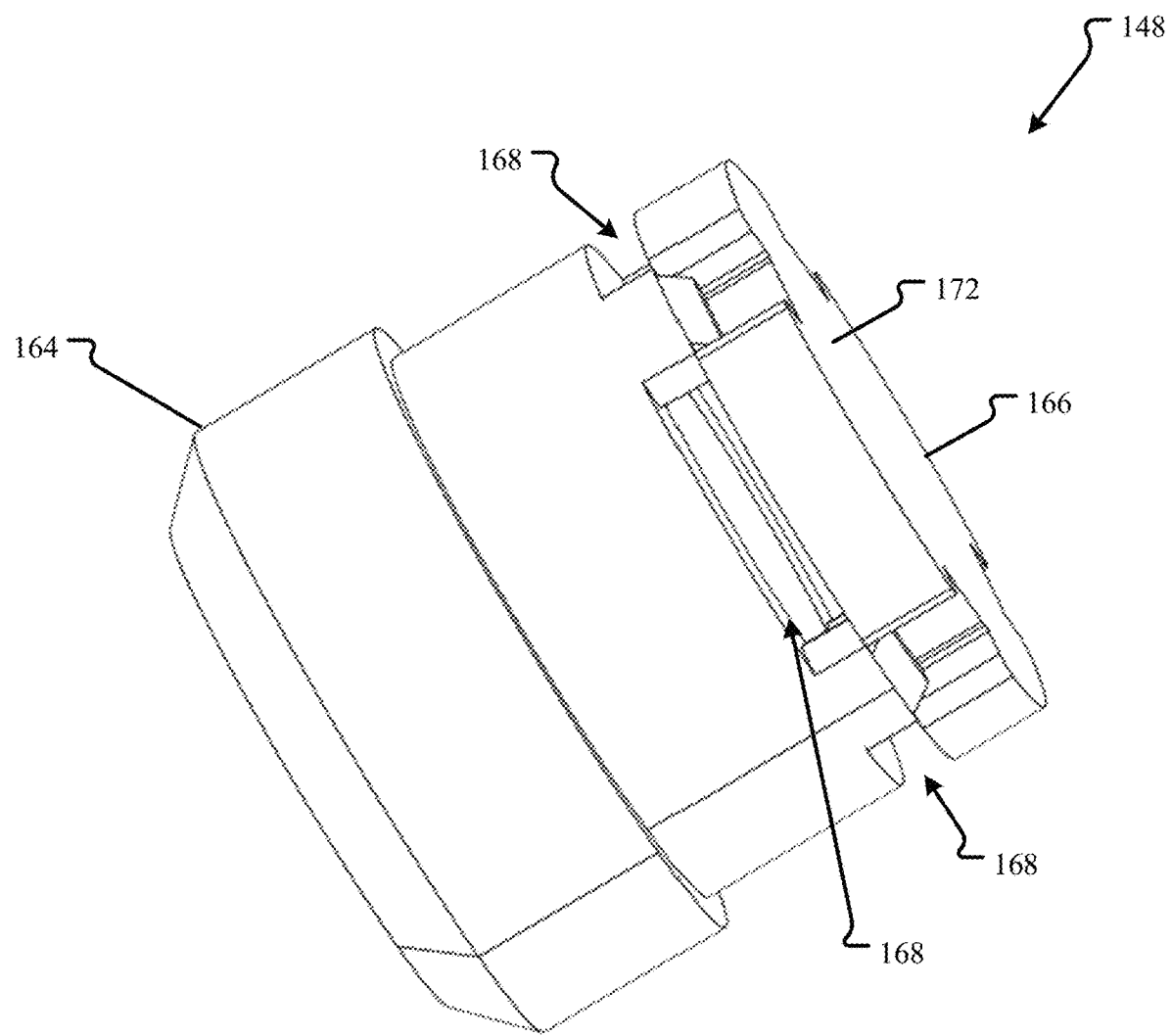
FIG. 10 is a perspective view of the nozzle shown in FIG. 7 and with the plate removed for clarity.

FIG. 7 is an elevation view of the plate 144 and the nozzle 148 for the boom turret 122 (shown in FIGS. 4-6). FIG. 8 is a side view of the plate 144 and the nozzle 148. FIG. 9 is a cross-sectional view of the plate 144 and the nozzle 148 taken along line 9-9 in FIG. 7. FIG. 10 is a perspective view of the nozzle 148 and with the plate 144 removed for clarity. Referring concurrently to FIGS. 7-10, the plate 144 is configured to form at least a portion of the boom turret and define the flow path therein. The nozzle 148 is mounted on the plate 144 and is configured to receive and discharge a pressurized fluid flow. The nozzle 148 includes an inlet 164 and an opposite outlet 166. In the example, the outlet 166 extends from the surface 146 of the plate 144 and extends at least partially into the debris flow and accumulation chamber. The inlet 164 is configured to be coupled to a pressurized fluid circuit 200 (shown in FIG. 11).

The nozzle 148 can be aligned along the inlet axis 138 and the outlet 166 of the nozzle 148 includes at least one opening 168 configured to release the pressurized fluid into the boom turret. The opening 168 is oriented in a radial direction that is substantially parallel to the surface 146 of the plate 144 and in a direction that is substantially orthogonal to the inlet axis 138. As such, the opening 168 is about 90° relative to the inlet orifice of the nozzle 148. This orientation directs the pressurized fluid at least partially along the surface 146 of the plate 144 so as to dislodge the accumulated debris. By directing the pressurized fluid along the surface 146 of the plate 144 the dislodgement force is able to move and breakup the entire slug of accumulated debris instead of merely blowing a hole through the accumulated debris if the openings are in an axial direction. In the example, the outlet 166 has four openings and each of the four openings are spaced approximately 90° from each other and open in a direction toward each of the corners 170 of the plate 144. In an aspect, each opening 168 has a circumferential angle of between about 40° and 80°. For example, the circumferential angle can be about 66°. In another aspect, the nozzle 148 can be centered on the plate 144.

It should be appreciated that while four openings 168 are illustrated in the example, any other number or array of openings of the nozzle 148 are contemplated herein. For example, the openings 168 may open towards the major and minor edges of the plate 144. In other example, three or five openings 168 may be defined in the nozzle. In still other examples, the openings 168 may be at least partially angled towards the surface 146 of the plate 144. In yet other examples, the plate 144 may include more than one nozzle 148 coupled thereto.

In the example, because the nozzle 148 is disposed within the flow path of the boom turret, it is subject to high contact forces from the debris and accumulation of the debris around the nozzle 148. As such, the outlet 166 of the nozzle 148 has an impact cover 172 that is configured to block debris from the openings 168 and is oriented in a direction that is substantially parallel to the plate 144 and substantially orthogonal to the inlet axis 138.

Figure 11:
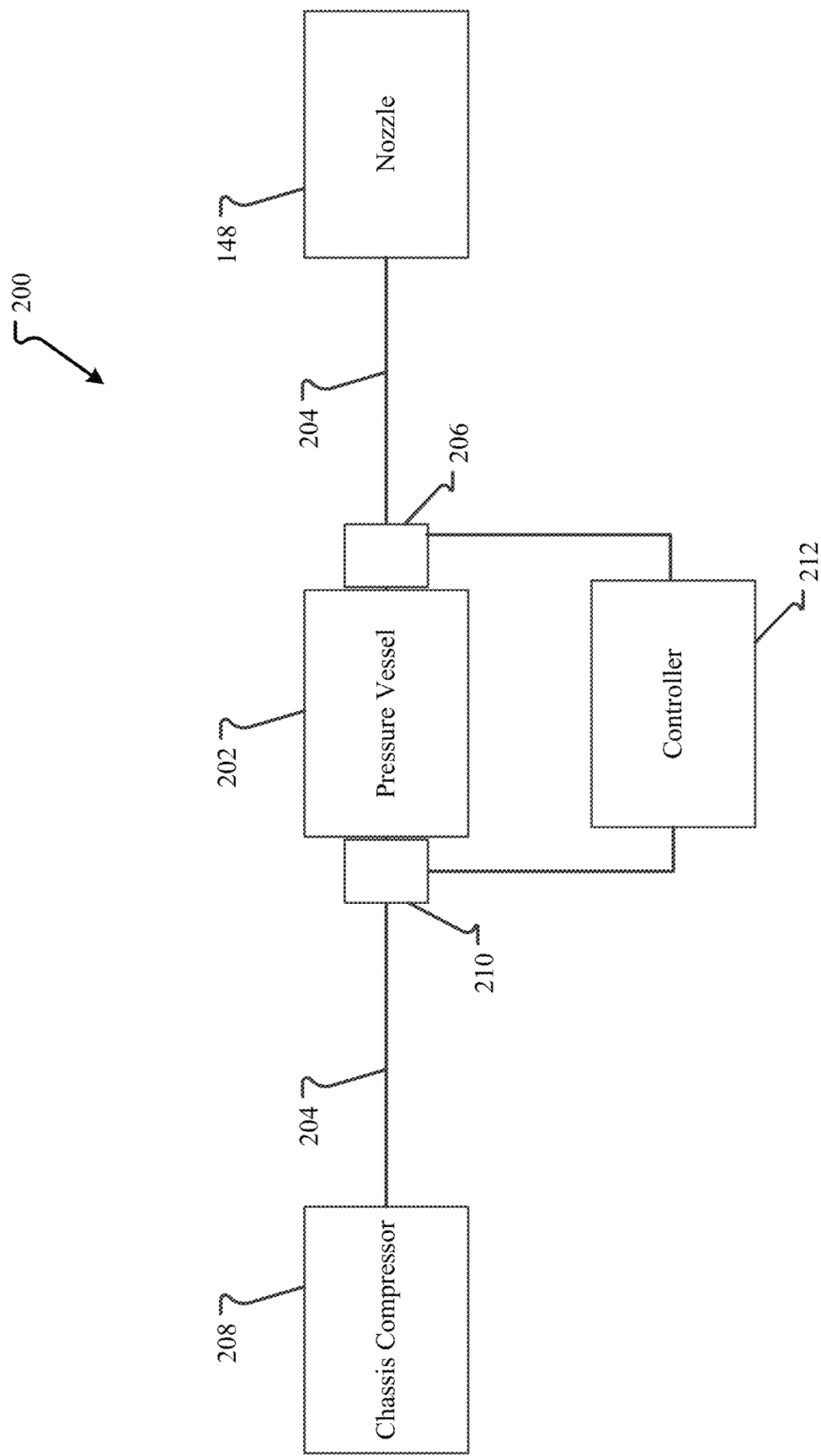
FIG. 11 is a schematic diagram of an exemplary pressurized fluid circuit for the boom turret shown in FIGS. 4-6.

FIG. 11 is a schematic diagram of an exemplary pressurized fluid circuit 200 for the boom turret 122 (shown in FIGS. 4-6). As described above, the boom turret utilizes pressurized fluid to facilitate the dislodgement of the accumulated debris. The pressurized fluid is channeled to the nozzle 148 via the circuit 200. In the example, the pressurized fluid is described as being air. However, it is appreciated that any other fluid can be used that enables the boom turret to function as described herein. For example, the pressurized fluid can be an inert gas, such as nitrogen (e.g., so as to not produce a spark), or water as required or desired.

In the example, the circuit 200 includes a pressure vessel 202 configured to hold a charge of pressurized fluid and the vessel 202 is coupled in flow communication to the nozzle 148 via a fluid line 204. In order to dislodge the built-up debris within the boom turret, a large volume of fluid is released through the nozzle 148 in a short amount of time. This release generates an impact force on the accumulated debris for dislodgment and breakup. In an aspect the vessel 202 is about two gallons. The circuit 200 includes a triggering mechanism 206 such as a quick release valve and/or an electric solenoid that releases the fluid from the pressure vessel 202 as required or desired. The pressure vessel 202 can be refilled by a compressor 208 such as a chassis compressor of the excavation vehicle or any other compressor or pump on the vehicle via fluid line 204. A valve 210 can be used to enable fluid flow from the compressor 208 into the vessel 202.

In operation, the compressor 208 channels a flow of pressurized fluid (e.g., air) into the vessel 202, and the vessel 202 holds a charge of pressurized fluid. The triggering mechanism 206 selectively releases the charge of pressurized fluid from the vessel 202 such that the charge is released from the nozzle 148 and into the boom turret. In the example, a controller 212 can be used to control the triggering mechanism 206 and the valve 210 of the circuit 200 and the pressurized fluid therein. For example, the charge of pressurized fluid can be released from the vessel 202 in a predetermined periodic time cycle (e.g., about every 30-45 seconds) during the vacuum operation of the excavation vehicle. Typically, buildup of debris within the boom turret can occur within a few minutes during the vacuum operation. In other examples, sensors may be used for determining release of the charge of pressurized fluid. For example, flow rate or pressure sensors within the debris flow path. Additionally or alternatively, video or blocking sensors may be used in the turret boom. Additionally, the filling of the pressure vessel 202 is controlled such that the vessel 202 can be refilled after every release. In aspects, the controller 212 of the circuit 200 may be included in the control panel 106 of the vehicle (shown in FIG. 2) such that the circuit 200 is controllable in conjunction with the other operations of the vehicle.

In the example, the release of pressurized fluid through the nozzle 148 is performed substantially simultaneously with the vacuum operation. That is, the vehicle is generating a vacuum flow condition within the boom turret such that debris is being channeled through the debris flow channel. As such, when the pressurized fluid is released and the accumulated debris is dislodged, the debris is subsequently vacuumed into the debris body for collection. In other examples, the vacuum operation may temporally be suspended while the accumulated debris is being discharged. That is, the release of pressurized fluid can occur independently from the vacuum operation.

Figure 12:
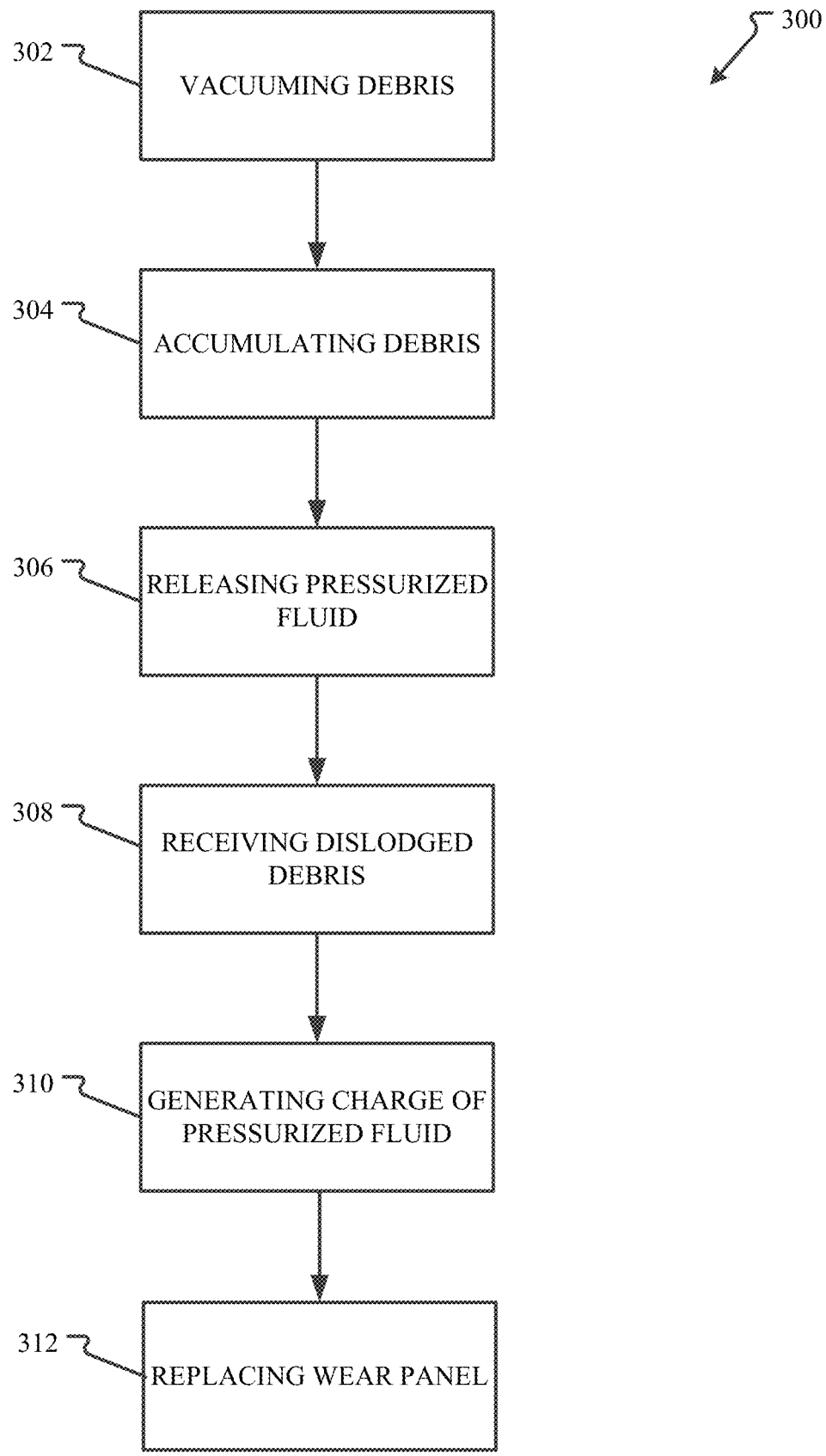
FIG. 12 is a flowchart illustrating an exemplary method of dislodging accumulated debris within a boom turret of an excavation vehicle.

FIG. 12 is a flowchart illustrating an exemplary method 300 of dislodging accumulated debris within a boom turret of an excavation vehicle. The method 300 begins with vacuuming debris through a hose and into a debris body of the excavation vehicle (operation 302). A boom turret is disposed between the hose and the debris body and enables the hose to rotate relative to the debris body. For example, the boom turret may be the turret described above in reference to FIGS. 4-6 and with a debris flow path that turns about 90° so as to enter the debris body. Debris is accumulated within an accumulation chamber of the boom turret (operation 304). By allowing at least some debris accumulation within the boom turret, wear is reduced and the performance of the pressurized fluid release and the nozzle is increased.

In conjunction with vacuuming debris (operation 302), a charge of pressurized fluid is selectively released into the accumulation chamber (operation 306). In the example, the charge of pressurized fluid is channeled through a nozzle mounted to a plate and within the boom turret so as to dislodge at least a portion of the accumulated debris from within the accumulation chamber. In an aspect, the movement of the accumulated debris dislodgement is in a direction that is substantially opposite of the flow path of the vacuumed debris through the boom turret. In another aspect, the release charge of pressurized fluid occurs at predetermined time intervals during the vacuuming operation.

After dislodgment of the accumulated debris, the dislodged accumulated debris is received within the debris body (operation 308). For example, the dislodged accumulated debris is vacuumed into the debris body. In some examples, after the charge of pressurized fluid is released (operation 306), another charge of pressurized fluid is generated (operation 310). This enables for the release of pressurized fluid to occur periodically and have a large volume of fluid be released quickly to generate the forces required to dislodge and move the accumulated debris. For example, a pressure vessel can be used to store the charge of pressurized fluid as required or desired. In some examples, the method 300 may further include replacing one or more wear panels (operation 312) within the boom turret and within the debris flow path.

In the example, the pressurized fluid is compressed air from a chassis compressor of the excavation vehicle. It should be appreciated that any other fluid can be used as required or desired. For example, inert gas can be used. By using inert gas the risk of a spark within the boom turret (e.g., from debris contacting itself or the side of the boom turret) igniting is reduced or prevented. In another example, water can be used and pressurized by a water pump.

Figure 14:
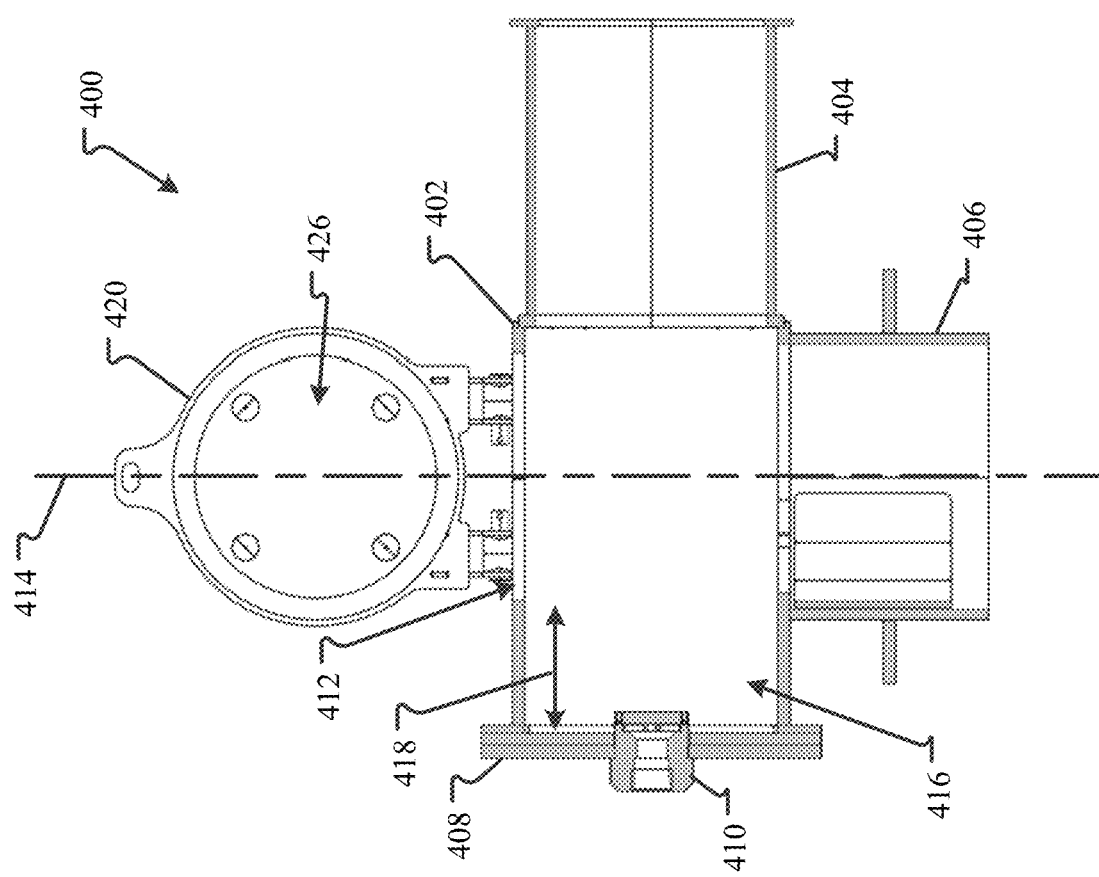
FIG. 14 is a cross-sectional view of the boom turret shown in FIG. 13.
Figure 13:
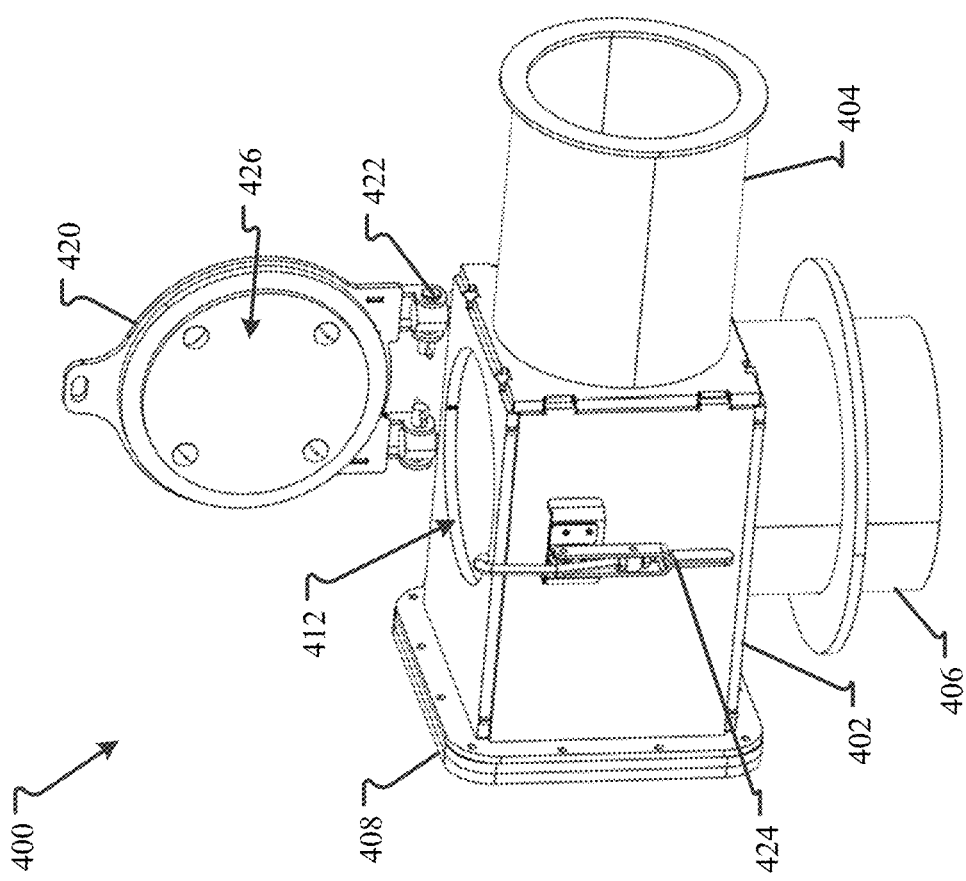
FIG. 13 is a perspective view of another boom turret for the excavation vehicle shown in FIG. 1.

FIG. 13 is a perspective view of another boom turret 400 for the excavation vehicle 100 (shown in FIG. 1). FIG. 14 is a cross-sectional view of the boom turret 400. Referring concurrently to FIGS. 13 and 14, the boom turret 400 is configured to couple the hose 110 and the debris body 114 (both sown in FIGS. 1-3) in flow communication as described herein. Similar to the examples described above, the boom turret 400 includes a body 402 having an inlet 404 and an outlet 406. A plate 408 is disposed opposite of the inlet 404 and has a nozzle 410 configured to receive a flow of pressurized fluid. However, in this example, an access hatch 412 is axially aligned with an outlet axis 414 of the outlet 406. By aligning the access hatch 412 and the outlet 406, an accumulation chamber 416 within the body 402 is at least partially defined by an offset 418 of the plate 408 that is substantially equal at the top and bottom of the accumulation chamber 416.

In this example, the inlet 404 is elongated, for example, its length greater than or equal to its diameter. Additionally, the access hatch 412 has a cover 420 coupled to the side of the body 402 at one or more hinges 422. The cover 420 can open and close and is shaped and sized to prevent access through the access hatch 412. A latch 424 can be used to secure the cover 420 in the closed position. The cover 420 has an inner surface 426 that when closed, is substantially flush with the inner surface of the body 402. By making the inner surface 426 of the cover 420 flush with the body 402, excess cavities within the debris flow path are reduced or prevented, and so as to decrease debris accumulation in areas other than the accumulation chamber 416.

FIG. 15 is a perspective view of another boom turret 500 for the excavation vehicle 100 (shown in FIG. 1). FIG. 16 is a cross-sectional view of the boom turret 500. Referring concurrently to FIGS. 15 and 16, the boom turret 500 is configured to couple the hose 110 and the debris body 114 (both sown in FIGS. 1-3) in flow communication as described herein. Similar to the examples described above, the boom turret 500 includes a body 502 having an inlet 504 and an outlet 506. A plate 508 is disposed opposite of the inlet 504 and has a nozzle 510 configured to receive a flow of pressurized fluid. However, in this example, an access hatch 512 is axially aligned with an outlet axis 514 of the outlet 506. The access hatch 512 has a cover 516 that is removable and that is shaped and sized to prevent access through the access hatch 512. The cover 516 has an inner surface 518 that when closed, is substantially flush with the inner surface of the body 502. Additionally, in this example, the outlet 506 is substantially circular in cross-section and attached to a bottom wall 520 of the body 502. The bottom wall 520 of the body 502 has a cutout 522 that enables flow into the outlet 506. The cutout 522 has a different perimeter than the cross-section of the outlet 506. In an aspect, at least a portion of a downstream portion of the bottom wall 520 overhangs 524 the outlet 506, while at least a portion of an upstream portion of the bottom wall 520 aligns with the outlet 506. In other aspects, the cutout 522 can have a substantially similar perimeter as the cross-section of the outlet 506.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting.

It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A boom turret for a debris body, the boom turret comprising:
    an inlet defining an inlet axis and configured to couple to a hose;
    an outlet defining an outlet axis and configured to rotatably couple to the debris body, wherein the inlet axis is substantially orthogonal to the outlet axis and a debris flow path is defined within the boom turret between the inlet and the outlet;
    a plate disposed between the inlet and the outlet and having a surface at least partially defining the debris flow path through the boom turret;
    a nozzle coupled to the plate and extending into the debris flow path, the nozzle including an impact cover parallel to the plate and spaced apart therefrom, the nozzle defining a nozzle axis and at least one opening at least partially defined by the impact cover, the at least one opening oriented in a direction that is orthogonal to the nozzle axis; and
    a pressure vessel configured to hold a charge of pressurized fluid, wherein the pressure vessel is coupled in flow communication with the nozzle and selectively releases the charge of pressurized fluid through the nozzle to dislodge accumulated debris within the debris flow path.

2. The boom turret of claim 1, wherein the nozzle axis is aligned with the inlet axis.

3. The boom turret of claim 1, further comprising an accumulation chamber configured to allow accumulation of debris within the debris flow path, and wherein the nozzle is at least partially disposed within the accumulation chamber.

4. The boom turret of claim 3, wherein the accumulation chamber is disposed between the inlet and the plate.

5. The boom turret of claim 1, further comprising a replaceable wear panel at least partially covering the surface of the plate.

6. The boom turret of claim 1, further comprising an access hatch configured to allow access into the debris flow path, wherein the access hatch is axially aligned with the outlet.

7. An excavation vehicle comprising:
    at least one pressurized fluid line configured to channel a flow of pressurized fluid;
    a debris body;
    a hose; and
    a boom turret coupling the debris body and the hose in flow communication, wherein the boom turret comprises:
        an outlet rotatably mounted on top of the debris body and extending substantially vertically relative to the debris body;
        an inlet coupled to the hose and extending substantially horizontally relative to the debris body, wherein a debris flow path is defined between the outlet and the inlet and allows vacuumed debris to flow from the hose and into the debris body;
        a plate at least partially defining the debris flow path; and
        a nozzle coupled to the plate and disposed at least partially within the debris flow path, wherein the nozzle selectively receives the flow of pressurized fluid from the at least one pressurized fluid line to dislodge accumulated debris within the debris flow path, wherein the nozzle includes an impact cover parallel to the plate and spaced apart therefrom, the nozzle defining at least one opening at least partially defined by the impact cover and oriented in a direction that is parallel to the plate.

8. The excavation vehicle of claim 7, wherein the at least one opening comprises four openings, and wherein each of the four openings are spaced approximately 90° from each other.

9. The excavation vehicle of claim 7, wherein the nozzle is centered on the plate.

10. The excavation vehicle of claim 7, wherein the plate is disposed opposite of the inlet and with the outlet therebetween.

11. The excavation vehicle of claim 10, wherein the plate is offset from the outlet such that an accumulation chamber is defined adjacent the plate and configured to allow accumulation of debris within the debris flow path.

12. The excavation vehicle of claim 7, wherein the boom turret further comprises an access hatch with a cover, and wherein the cover has an inner surface that is substantially flush with the boom turret when in a closed position.

13. The excavation vehicle of claim 7, wherein the at least one pressurized fluid line comprises a pressure vessel coupled to a chassis compressor of the excavation vehicle.

14. A method of dislodging accumulated debris within a boom turret of an excavation vehicle, the method comprising:
    vacuuming debris through a hose and into a debris body of the excavation vehicle, wherein the boom turret is disposed between the hose and the debris body and enables the hose to rotate relative to the debris body;
    accumulating debris within an accumulation chamber of the boom turret;
    selectively releasing a charge of pressurized fluid into the accumulation chamber via a nozzle mounted to a plate within the boom turret so as to dislodge at least a portion of the accumulated debris, wherein releasing the charge of pressurized fluid occurs in conjunction with vacuuming debris, wherein the nozzle includes an impact cover parallel to the plate and spaced apart therefrom, the nozzle defining a nozzle axis and at least one opening at least partially defined by the impact cover, the at least one opening oriented in a direction that is orthogonal to the nozzle axis, the charge of pressurized fluid being released through the at least one opening of the nozzle; and
    receiving the dislodged accumulated debris within the debris body.

15. The method of claim 14, wherein selectively releasing the charge of pressurized fluid occurs at predetermined time intervals during the vacuuming operation.

16. The method of claim 14, wherein the method further comprises generating another charge of pressurized fluid after the charge is released.

17. The method of claim 14, wherein the pressurized fluid is compressed air from a chassis compressor of the excavation vehicle.

18. The method of claim 14, further comprising replacing one or more wear panels within the boom turret.

* * * * *